Feb. 20, 1934.  O. E. FISHBURN  1,947,703
ROLLER CLUTCH
Filed May 25, 1931  2 Sheets-Sheet 1
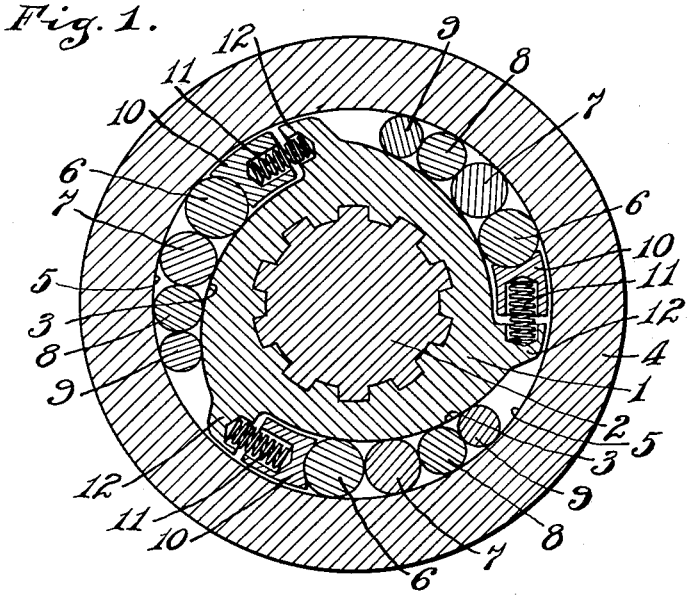
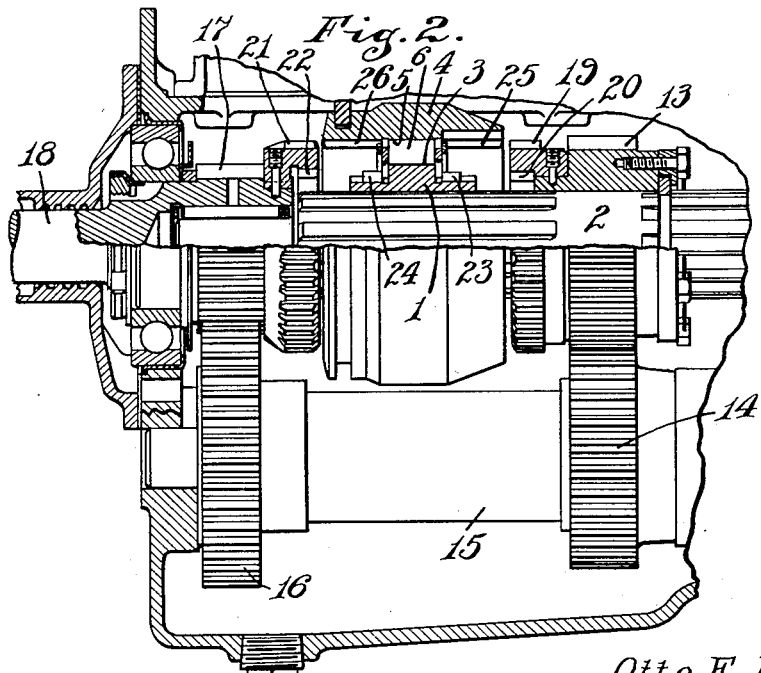
Inventor
Otto E. Fishburn,
By Hood + Hahn.
Attorneys

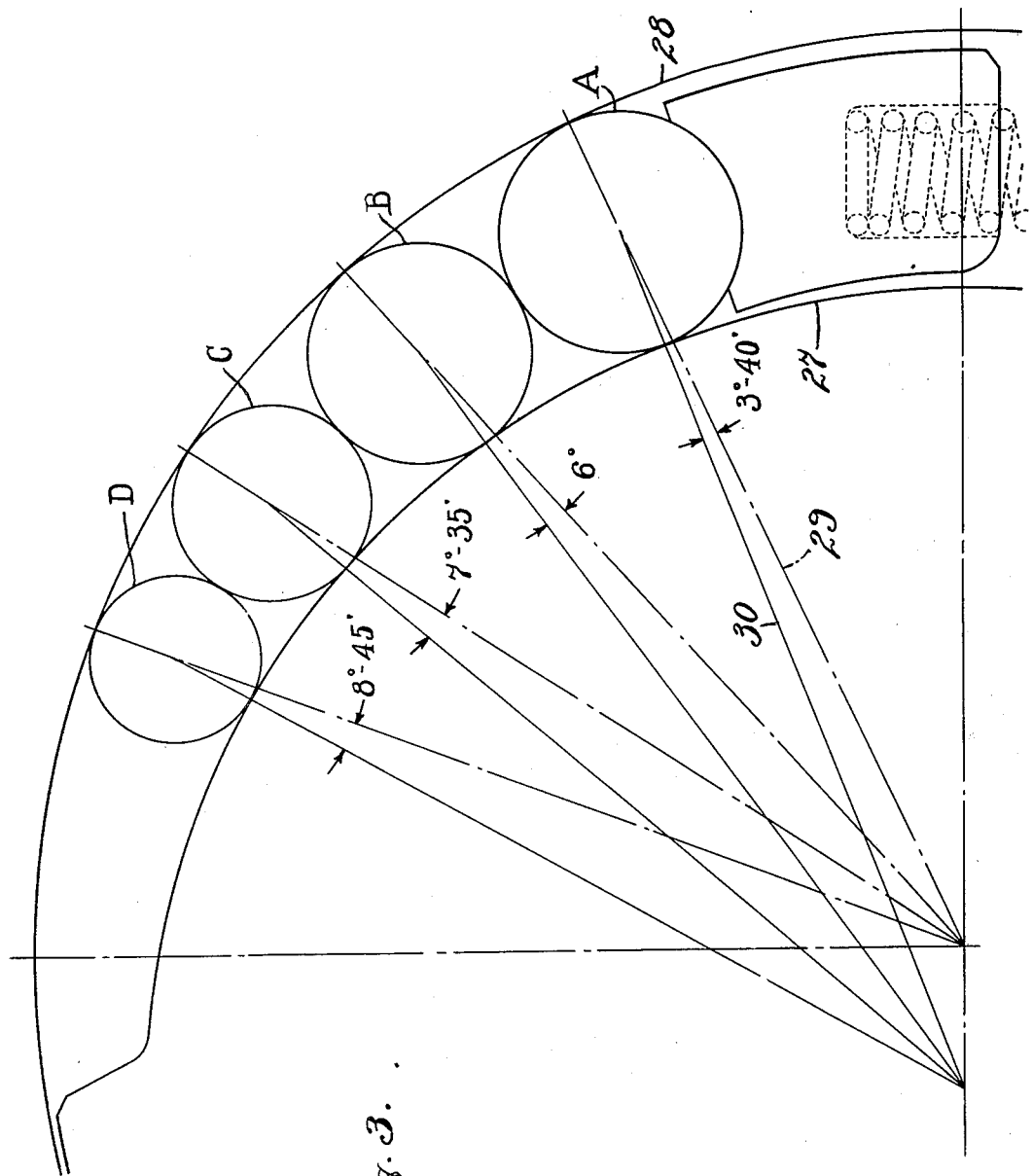

Patented Feb. 20, 1934

1,947,703

UNITED STATES PATENT OFFICE 1,947,703

ROLLER CLUTCH

Otto E. Fishburn, Muncie, Ind., assignor, by mesne assignments, to Free Wheeling Patents Corporation, South Bend, Ind., a corporation of Delaware Application May 25, 1931. Serial No. 539,684

2 Claims. (Cl. 192—45)

My invention relates to improvements in clutches and particularly to that type of clutch generally known as an overrunning clutch, wherein the clutch will engage when the two parts tend to rotate relatively in one direction, but where the tendency is to rotate relatively in the opposite direction the clutch will not engage.

The clutch of my invention is particularly applicable to that type of automobile transmission which has become known as the "free wheeling" type. In this type of transmission, when the vehicle through momentum, becomes the driving member, the vehicle, or the propeller shaft thereof, is disconnected from the engine until the relative speeds between the engine shaft and the propeller shaft is such that the engine again becomes the driving member. It is extremely desirable in this type of mechanism that the clutch for connecting the engine shaft with the propeller shaft operate with a minimum amount of wear, releases instantly and engages with no perceptible jar or shock.

The clutch of my invention has all of these advantageous features.

For the purpose of disclosing the invention, I have illustrated an embodiment thereof in the accompanying drawings, in which:

Fig. 1 is a transverse sectional view of the clutch of my invention;

Fig. 2 is a longitudinal sectional view showing the clutch in one arrangement of a free wheeling transmission, and Fig. 3 is a diagrammatic view showing more particularly the angle of engagement of the rollers of the clutch.

In the embodiment illustrated, the clutch comprises an inner member 1, which is preferably splined on the driven shaft 2 of the transmission. This inner member is provided with a plurality of, in the present instance three, cammed surfaces 3, each of which is similar to the other. Surrounding the inner member is an outer clutch member 4 having an inner peripheral clutch surface 5 and interposed between each of the cams 3 and the surface 5 is a plurality of wedging rollers 6, 7, 8 and 9. These rollers gradually diminish in diameter in conformity to the diameter of the cammed surface 3. The rollers are biased toward engaging position by means of shoes 10 engaging behind the largest roller and urged into operating position by coiled springs 11 interposed between the shoes and stationary shoulders 12 on the inner member.

In the transmission illustrated the free wheeling clutch is arranged between second and high speeds and the arrangement is such that when desired this free wheeling clutch may be "locked out". To this end the driven shaft 2 of the transmission is provided with a rotatable gear 13 meshing with a gear 14 on a jack shaft 15 in turn driven by a gear 16 meshing with a gear 17 on the drive shaft 18. The gear 13 is provided with an outer set of teeth 19 and an inner set of teeth 20 while the shaft 18 is provided with similar teeth 21 and 22. The inner member 1 of the overrunning clutch is provided with a set of teeth 23 adapted to mesh with the teeth 20 and a set of teeth 24 adapted to mesh with the teeth 22 and when so meshed is arranged to connect the gear 13 directly to the shaft 2 or the shaft 2 directly to the drive shaft 18. The outer member 4 of the overrunning clutch is provided with teeth 25 adapted to mesh with the teeth 19 and teeth 26 adapted to mesh with the teeth 21 and when so meshed the gear 13 will be connected to the shaft 2 through the overrunning clutch or the shaft 2 will be connected through the overrunning clutch to the drive shaft 18.

In the construction of my clutch and particularly when the same is designed for use as heretofore described, I have found that the angle of engagement of the rollers with the cam surface is extremely important. I have also found that in the use of a plurality of rollers the angle of engagement should be varied in order to obtain the most efficient results. If the angle of engagement is too great, the rollers will not hold and there will be a tendency for them to kick back. Furthermore, if the angle of engagement is too low, the rollers will tend to stick and not disengage freely.

For the purpose of illustration I have shown in Fig. 3 a diagrammatic view of one of the cam members with its accompanying rollers. In this figure the cam surface which may be termed the segment is designated at 27. While the outer member, which may be designated as the race is shown at 28, the rollers are illustrated at A, B, C and D. The angle of engagement of the rollers is the angle between a line normal to the tangent of the roller at the point that it contacts with race 28, which line is designated at 29 and a line normal to the tangent of the segment 27 at the point the roller contacts with the segment, which line is designated at 30. It will be noted that the line 29 passes through the center of the circle of the contacting face of the race 28, and the line 30 passes through the center of the roller and the center of the segment 27. The angle between these lines determines the angle of engagement of the roller with the segment 27. In the particular size of the clutch which I have chosen for illustration, the angle of engagement of the roller A with the segment 27 is 3° and 40'. The angle of engagement of the roller B is 6°. The angle of engagement of the roller C is 7° and 35' and the angle of engagement of the roller D is 8° and 45'. I have found that in the particular size of clutch which I have chosen for illustration these angles give decidedly effective results. The roller A may be considered as the "wedging" roller, while the remaining rollers B, C and D might be termed the engaging or driving rollers. Due to the increase of the angle of engagement of the rollers B, C and D, there is less tendency for these rollers to wedge lock, that is wedge so as not to permit quick disengagement, than there is on the part of the roller A. On the other hand the rollers B, C and D will not take hold as effectively as will the roller A. That is, with the higher angle of engagement on the part of rollers B, C and D, without the roller A, when the clutch tends to take hold, especially under a high torque load, there might be a tendency for the rollers B, C and D to "kick" back and not take hold. The roller A, therefore, with its low angle of engagement will thus, when the clutch becomes operative, engage and tend to drive the rollers B, C and D into engagement and hold them in such engagement whereby the parts become effectively locked up and at the same time the load is evenly distributed over the four rollers. On the other hand the high angle of engagement of the rollers B, C and D will prevent the roller A from "wedging". Likewise when the clutch disengages, the rollers B, C and D will have a slight tendency to "kick" the roller out of engagement.

As a result I am able to provide a clutch of the roller type wherein the load is evenly distributed, the clutch will take hold with the minimum of "bump" and will release quickly and with no sticking.

It is obvious that instead of the segment being on the inner member it may be arranged on the outer member and the "race" may be arranged on the inner member. The terms race and segment have been adopted for convenience and clarity of description.

I claim the following:

1. A roller clutch comprising a cam member, a race member and a plurality of rollers cooperating with said members and gradually decreasing in size, the angle of engagement between the largest roller and the cam member being substantially 3° and 40' and the angle of engagement of the smallest roller being substantially 8° and 45'.

2. A roller clutch comprising a cam member, a race member and a plurality of rollers cooperating with said members and gradually decreasing in size, the angle of engagement between the largest roller and the cam member being substantially three degrees and forty minutes, the angle of engagement of the next roller being substantially six degrees, the angle of engagement of the next roller being substantially 7 degrees and thirty-five minutes and the angle of engagement of the smallest roller being substantially eight degrees and forty-five minutes.

OTTO E. FISHBURN.